United States Patent Office 3,503,477
Patented Mar. 31, 1970

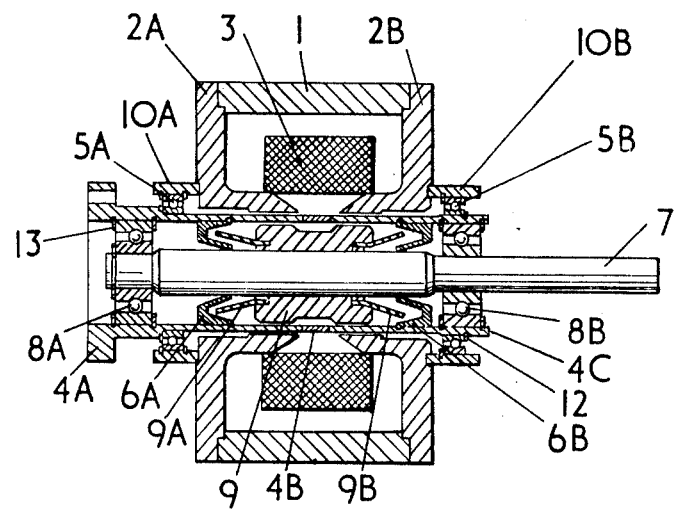

3,503,477
MAGNETIC PARTICLE COUPLINGS
Kenneth George Hoer, Beckenham, England, assignor to Muirhead & Co. Limited, Beckenham, Kent, England, a British company
Filed Nov. 3, 1967, Ser. No. 680,438
Claims priority, application Great Britain, Nov. 14, 1966, 50,880/66
Int. Cl. F16d 37/02
U.S. Cl. 192—21.5          1 Claim

ABSTRACT OF THE DISCLOSURE

A magnetic particle coupling in which the magnetic particles are contained between a cylindrical rotor mounted on longitudinal spaced bearings and a shaft concentrically mounted for rotation within the cylindrical rotor and locked for rotation therewith when the coupling is magnetized.

---

This invention is applicable to magnetic particle couplings.

The coupling operates to magnetically couple an input shaft and an output shaft. The shafts are mounted separately and are free to rotate independently until electrical power is applied to an energizing coil. The application of electricity magnetically locks the driving and driven member, thus imparting a torque to the output shaft.

All known devices suffer from the defect that the input and output shafts will never be truly concentric one to the other. This lack of concentricity can create out of balance forces and vibration together with a sun and planet effect, whereby the speed of the output shaft is not synchronized with the input. Furthermore, the other devices have been complicated to assemble and disassemble and leave little free space for an effective design of the particle dust seals and deflectors with the further disadvantage that the eccentricity and vibration of the shaft has made it difficult to make an effective seal.

It is an object of the present invention to provide a coupling which is free from the above defects.

In one aspect the invention consists in a magnetic particle coupling comprising a rotatable cylindrical member, a shaft mounted for concentric rotation within the cylindrical member, bearing members for the shaft mounted within the cylindrical member, a mass of magnetic particles supported between the shaft and cylindrical members and means for energizing the magnetic particles to lock the shaft and cylindrical member for rotation together.

The means for energizing the magnetic particles comprises a low retentivity cylindrical magnetic block mounted around the shaft and magnetizing means therefor mounted around the cylindrical member.

Conveniently the cylindrical member is mounted between bearings spaced along its length and comprises two outer ends of material of low magnetic retentivity separated by a non-magnetic ring.

Preferably the magnetizing means comprises a magnetizing coil supported within an open casing of material of low magnetic retentivity forming pole pieces adjacent the cylindrical member.

The figure refers to a device according to an embodiment of the invention and is a cross sectional view of the complete coupling assembly.

A body 1 of low retentivity magnetic material is cylindrical in shape and together with pole pieces 2A, 2B forms an outer magnetic path. Within this outer magnetic path is contained a magnetizing coil 3. This assembly in use will be secured to a rigid support (not shown).

The body 1, 2A, 2B is bored through its center to form a rotor tunnel and has brazed or otherwise secured thereto, two non-magnetic bearing support rings 10A, 10B.

Mounted within the rotor tunnel with a minimum air gap but free to rotate, is a three-part hollow cylinder 4A, 4B, 4C. This cylinder rotates on bearings 5A, 5B, which are mounted in the bearing support rings of the stationary body.

The three-part cylinder is constructed with the two outer ends of magnetic material of low retentivity, but the center piece 4B is non-magnetic. The whole is brazed or otherwise secured together as one piece.

A rotor consisting of a center shaft 7 provided with one cylindrical low retentivity magnetic block 9 secured thereto in an appropriate position, is inserted into the hollow cylinder 4A, 4B, 4C and is carried by bearings 8A, 8B. It is so constructed that it will rotate freely within the cylinder but with a minimum of clearance.

Particle deflectors 9A, 9B are fixed to the magnetic block 9 and particle dust seals 6A, 6B are fixed to the hollow cylinder. There is a large useful volume between the inner rotor 9 and the hollow cylinder which permits a great freedom of design of the dust seals 6A, 6B and the deflectors 9A, 9B. This volume houses the deflectors 9A, 9B fitted to the inner rotor to reduce the amount of magnetic particle dust which reaches the dust seals 6A, 6B. The volume is partially filled with a suitable magnetic particle dust.

The shaft 7 can be either the driving or driven shaft and at the other end, the hollow cylinder acts in the opposite role. Assume, however, that the hollow cylinder is rotating while the shaft is held stationary. Application of electrical energy to the coil 3 will energize the magnetic paths and by virtue of the magnetic dust particles, as explained in the known art, a magnetic couple will be exerted on the block 9 causing it to rotate in synchronism with the hollow cylinder. As the shaft is directly mounted within the cylinder, it will form part of the cylinder and rotate therewith in exact concentricity.

The construction of the complete rotor assembly lends itself to easy assembly and disassembly by the removal of circlips 12 and 13, thus easing the problems both of production and maintenance.

I claim:
1. A magnetic particle coupling comprising a body defining a cylindrical rotor tunnel and being of low magnetic retentivity material, a coil winding inside of said body and coaxial with said tunnel, annular pole shoes on said body and coaxially spaced from one another inside said tunnel, rotor bearings attached to said body at opposite ends of said tunnel, a rotatable cylindrical rotor sleeve member passing coaxially through said tunnel and composed of three united cylindrical sections arranged end to end with the center section being or non-magnetic material and the other two sections being of low magnetic retentivity material and encircled by said pole shoes respectively while supported for rotation by said rotor bearings respectively, a connection device at one end of said rotor member, two spaced shaft bearing members disposed inside respective end-portions of said rotor sleeve member, a shaft mounted for concentric rotation within the cylindrical rotor tunnel on said shaft bearing members and protruding at one end portion from said sleeve member, a block of low magnetic retentivity material fixed to said shaft between said shaft bearings and providing two circumferentially extending surfaces disposed opposite said pole shoes respectively, particle dust seals disposed between said block and said shaft bearings respectively, a mass of magnetic particles supported between the shaft and the cylindrical rotor tunnel and located in the space defined between said field and opposed surfaces of said sleeve, said block and said shaft, whereby energization of the coil agglomerates the magnetic particles between the block and the sleeve member to lock the shaft and body for rotation together as a single unit, the inner and outer cylindrical surfaces of said sleeve member being formed with circlip holding grooves, first circlip means holding the sleeve member against axial motion in said rotor tunnel, and second circlip means holding said shaft bearings against axial motion in said sleeve member.

References Cited

UNITED STATES PATENTS

| | | | |
|---|---|---|---|
| 2,575,360 | 11/1951 | Rabinow | 192—21.5 |
| 2,673,631 | 3/1954 | Gold | 192—21.5 |
| 2,702,016 | 2/1955 | Reece | 192—21.5 X |
| 2,752,800 | 7/1956 | Raymond et al. | 192—21.5 X |
| 2,799,876 | 7/1957 | Finn et al. | 192—21.5 X |
| 3,358,798 | 12/1967 | Janson | 192—21.5 |

BENJAMIN W. WYCHE III, Primary Examiner

U.S. Cl. X.R.

192—110